US005142508A

United States Patent [19]

Mitchell et al.

[11] Patent Number: 5,142,508

[45] Date of Patent: Aug. 25, 1992

[54] AQUATIC TRANSDUCER SYSTEM

[76] Inventors: Thomas R. Mitchell, 2520 Rubidoux Blvd., Riverside, Calif. 92509; Robert E. Landesman, 598 W. Huntington Dr., Unit F, Arcadia, Calif. 91006

[21] Appl. No.: 552,907

[22] Filed: Jul. 16, 1990

Related U.S. Application Data

[62] Division of Ser. No. 405,749, Sep. 11, 1989, Pat. No. 5,012,457.

[51] Int. Cl.[5] .................... G01S 15/00

[52] U.S. Cl. .................... 367/141; 367/93; 367/136; 310/337; 340/566

[58] Field of Search .................... 367/175, 157, 131, 141, 367/136, 93; 310/337; 340/541, 566

[56] References Cited

U.S. PATENT DOCUMENTS

| | | | |
|---|---|---|---|
| 3,073,916 | 1/1963 | Williams et al. | 367/175 |
| 3,670,299 | 6/1972 | Kalm | 367/175 |
| 3,969,712 | 7/1976 | Butman et al. | 367/136 |
| 4,115,667 | 9/1978 | Babb | 381/194 |
| 4,121,200 | 10/1978 | Colmenero | 367/172 |
| 4,187,502 | 2/1980 | Beverly et al. | 367/93 |

FOREIGN PATENT DOCUMENTS

| | | |
|---|---|---|
| 1510141 | 5/1978 | United Kingdom . |

OTHER PUBLICATIONS

"New Thrills With Underwater Sound", by James Joseph, Popular Mechanics, vol. III, No. 5, May 1959.

*Primary Examiner*—J. W. Eldred
*Attorney, Agent, or Firm*—Christie, Parker & Hale

[57] ABSTRACT

An underwater transducer system reproduces high-fidelity audio signals underwater, and detects and monitors low levels of sound activity, both adjacent to a body of water such as a swimming pool, and in the water. The system includes an underwater housing for a diaphragm that directly contacts the water, a coil assembly movable within the housing and rigidly connected to the center of the diaphragm by a tubular member of the coil assembly engaging a cylindrical boss portion of the diaphragm. The housing can be suspended by an elongated cord member from a wall coping, or mounted within a wall fixture structure. The system can have a source of illumination, a conduit from the source terminating in the housing on the coil axis proximate the diaphragm, and an optical element sealingly protrudes the diaphragm for transmitting light-amplified illumination into the water. A head portion of the optical element that substantially fills the boss portion of the diaphragm incorporates a pair of mirrored surfaces for spreading the illumination and transmitting it into the water. A control unit located to one side of the water provides a speaker mode and a microphone mode of operating the transducer, the microphone mode having a monitor mode and an alarm mode for detecting an alarm condition based on discrimination of an alarm sound condition occurring in the pool. The control unit can also interface a closed circuit TV for visually monitoring the pool. Also disclosed is a method for making the underwater transducer.

16 Claims, 3 Drawing Sheets

AQUATIC TRANSDUCER SYSTEM

This is a division of the application Ser. No. 405,749, filed Sept. 11, 1989 now U.S. Pat. No. 5,012,457.

BACKGROUND

The present invention relates to aquatic alarms and sound systems and, more particularly to apparatus for producing high-fidelity sound underwater, and for reliably signalling unauthorized activity in or near a body of water such as a swimming pool or spa.

Traditionally, underwater speakers have been used primarily for public plunges and aquatic athletic events. They have been either temporary installations using pulley methods for lowering the speaker into the water, or permanent installations that project outwardly from the concrete side-walls of a swimming pool. In the latter case, in-field repair or replacement has been extremely difficult, if not impossible. Conventional underwater speakers have relatively poor fidelity in that they introduce unwanted distortion, and they have limited frequency response in that they typically can only reproduce high frequencies. Consequently, underwater speakers are not normally used for producing music. This poor performance is related to an alignment spider that is typically connected to a diaphragm of the speaker for preventing contact between an attached voice coil and a permanent magnet that is closely spaced thereto.

Intrusion alarms for swimming pools and the like are known. Typically they produce an alarm signal in response to wave motion that is generated when, for example, a child falls into the pool. Such alarms are often ineffective in that a child can enter the pool and drown without producing sufficient wave motions to trip the alarm, or the alarm is not triggered by the initial entry but only after the child is in distress—possibly too late for help to arrive in time. Also, existing alarm systems do not distinguish between normal recreational activity and situations requiring assistance or intervention. Moreover, wave motion sensors are subject to damage from normal recreational activity, and from weathering.

Thus there is a need for an underwater speaker system that is effective for producing High-fidelity sound, particularly at low frequencies, that is convenient to install, easy to service, and does not interfere with normal aquatic activities. There is a further need for a pool intrusion alarm that is effective for monitoring a body of water, signalling unauthorized entry, whether or not such activity is accompanied by significant wave activity, and that is not subject to damage from normal pool activity or weathering.

SUMMARY

The present invention meets this need by providing an underwater transducer system that is particularly effective for reproducing a high-fidelity audio signal underwater, and for detecting and monitoring low levels of sound activity in the water. In one aspect of the invention, the system includes a housing, means for positioning the housing in a body of water, a diaphragm in the housing, an outer edge thereof connected to the housing with the diaphragm directly contacting the water, a coil assembly having at least one turn of a conductor on a coil axis, a pair of coil terminals at opposite ends of the conductor, the coil assembly being movable within the housing and rigidly connected to the center of the diaphragm by means of a tubular member of the coil assembly engaging a cylindrical outside surface of a boss portion that is formed in the diaphragm, and a magnetic field intersecting the conductor for correlating sound waves in the water with a voltage between the coil terminals. This system is particularly effective in producing high-fidelity sound underwater because the means for centering the coil permits the use of a very large coil and field magnet combination, yet does not require a conventional centering spider which would detract from the sound output and introduce distortion.

Preferably the tubular member has an end registration surface perpendicular to the coil axis and that engages an outwardly radiating portion of the diaphragm proximate the boss portion for further facilitating the centering of the coil assembly with the diaphragm. The system can further include an adhesive material, which can be an epoxy resin, for rigidly holding the tubular member on the boss portion. The means for producing the field can be a field magnet having an annular slot for movably receiving the coil assembly, the system preferably including a cylindrical strip of lubricative plastic for preventing contact between the coil assembly and the magnet. Also, the coil assembly is preferably provided with a first connector element on a free end of a flexible member that is attached to the tubular member for removably connecting the coil terminals to a pair of transducer conductors extending from the housing, thereby facilitating field maintenance as well as initial assembly of the system.

In another aspect of the invention, the diaphragm can include a rigid armature member and flexible ring member connected to an outer periphery of the armature member to form the outer edge of the diaphragm, the system further including flexible submerged plate member, means for moving an armature connection point of the plate member in a direction normal to the plate member in response to movement of the armature member, and means for connecting the plate member to the housing at locations spaced about the armature connection point for causing the plate member to flex, thereby to producing the correlation between the voltage between the coil terminals and the sound in the water.

The body of water can be in contact with a wall structure to which the housing is adapted for mounting. In one aspect, the housing can be mounted in a fixture recess of the wall structure. In another aspect, the housing can be suspended by an elongated cord member from a coping that forms an upper extremity of the wall structure, the system also including a control unit that is located to one side of the water, the cord member connecting the control unit to the housing, and a hanger member for engaging the coping, the hanger member being connected to the cord member. A preferred configuration of the hanger member has a passage for grippingly receiving cord in a metallic material that is formed with uniform cross section. It is further preferred, when the coping has a lip portion extending horizontally from the wall structure to a lip extremity, that the hanger member be field-formable about the lip portion for positioning a vertically extending portion of the cord member below the lip portion, between the wall structure and the lip extremity. It is further preferred that the cord member be provided with a cover member that extends from proximate the hanger member toward the control unit for preventing those passing between the hanger member and the control unit from being tripped by the cord member.

In another aspect of the invention, the system can be provided with a source of illumination, and conduit means for conducting the illumination to within the coil assembly, thence through the diaphragm for illuminating the water. The source of illumination can be external to the housing, the conduit means including a flexible optical conduit that extends from the source of illumination, along the coil axis, to a point of termination proximate the diaphragm, and an optical element that protrudes the diaphragm, the element being sealingly mounted to the diaphragm, for receiving illumination from the conduit and transmitting same into the water. Preferably a head portion of the optical element substantially fills the boss portion of the diaphragm for spreading the illumination to an exit diameter that approximates a coil diameter of the coil assembly. More preferably, the optical element has a first mirrored surface centered on the head portion for reflecting the illumination radially outwardly and rearwardly within the head portion and toward the conduit, and a second mirrored surface in the head portion for reflecting the reflected illumination forwardly and into the water. Moreover, the system can also include means for modulating the brightness of the illumination source in relation to the movement of the coil.

In another aspect, the system can include an audio signal source and speaker connection means for driving the coil terminals in response to the signal source, producing the sound waves in the water in response to the signal source. The system can further include power amplifier means, and means for connecting the power amplifier means between the signal source and the coil terminals.

In another aspect of the invention, the system is provided with signal amplifier means, signal output means, and microphone connection means for connecting the signal amplifier means between the signal output means and the coil terminals for signalling activity in the water to a location outside the water. Preferably the system further includes threshold means for producing an alarm signal in response to a predetermined output from the signal amplifier means. The threshold means can have an adjustment for setting an alarm threshold magnitude. Preferably the threshold means includes discriminator means for filtering a signal amplifier output, whereby a predetermined signal pattern associated with a crisis condition produces the alarm signal at a relatively low signal energy level, and a signal pattern associated with normal pool activity does not produce the alarm signal, even at a higher signal energy level. Thus the present invention is effective for remotely signalling an alarm condition based on sounds that are generated in the body of water, in response to either unauthorized entry or to signal patterns indicative of an emergency condition. Preferably the discriminator means can includes a band-pass filter having a first corner frequency of approximately 20 Hz and a second corner frequency of approximately 100 Hz. The discriminator means also produces a prefered frequency gain rolloff of at least approximately 24 dB per octave outside of the first and second corner frequencies.

The alarm signal can be operatively connected to a housing indicator on the housing, the housing indicator being visible underwater for locally signaling occurrence of the alarm condition. Persons nearby would thus be prompted to take remedial action, if necessary, and report to those remotely monitoring the alarm condition. Preferably, the threshold means further includes latch means for holding the alarm signal following an alarm condition.

In a further and important aspect of the invention, the system can also include a radio transmitter operatively responsive to the threshold means for producing an alarm transmission, and a radio receiver for producing a system alarm signal in response to the alarm transmission. Preferably the threshold means also includes oscillator means for producing and transmitting an alarm tone when the alarm signal is present.

In a further aspect, the system includes a combination of the audio signal source and speaker connection means, and the signal amplifier means, signal output means, and microphone connection means, and switching means for inhibiting the microphone connection means in a first mode wherein the sound waves are produced in the water in response to the audio signal source, and for inhibiting the speaker connection means in a second mode wherein the signal output means is responsive to the sound waves in the water for remotely signalling activity in the water. This combination can further include the power amplifier means connected between the audio signal source and the coil terminals in the first mode, and/or the threshold means for producing the alarm signal. Preferably the second mode of the switching means is operative in a monitor submode wherein the signal amplifier means drives the signal output means for continuously monitoring sound activity in the water, and alarm submode wherein the threshold means drives the signal output means for signalling occurrence of the alarm condition.

In a further aspect, the system includes the housing and means for positioning in the water, aquatic transducer means in the housing and including the diaphragm, the means for connecting the diaphragm to the housing, a coil member having at least one turn of a conductive material and forming the pair of coil terminals, and means for connecting the coil member to the diaphragm for correlating a voltage between the coil terminals and sound waves in the water, together with the signal amplifier means, the signal output means, the microphone connection means, the audio signal source, the speaker connection means, and the switching means for providing the first mode for producing the sound waves in response to the audio signal source and the second mode for signalling the activity in the water to a location outside the water.

In an other aspect, the system includes the housing for mounting in the fixture recess, the aquatic transducer means, the source of illumination, the conduit means for conducting the illumination, the audio signal source, the signal amplifier means, the speaker connection means, and the means for modulating the brightness of the illumination source in response to the audio signal source.

In another and important aspect of the invention, the system is capable of signalling an approach by an intruder to proximate a surveillance region such as the vicinity of a body of water, and includes one or more transducer units for producing an alarm signal in response to an alarm condition, having radio transmitter means for producing an alarm transmission in response to the alarm signal, and radio receiver means for producing a system alarm signal upon occurrence of the alarm transmission from any one transducer unit. At least one of the transducer units can have a base that is mountable on a movable member such as a gate that is opened for access to the surveillance region, the unit producing the alarm signal in response to movement of the movable member.

A still further aspect of the invention provides a method for making an underwater transducer, including the steps of:

(a) providing a housing for positioning in a body of water, the housing having a cavity therein;

(b) forming a diaphragm with a peripheral edge and a centrally located boss portion, the boss portion having a cylindrical outside surface;

(c) providing a coil assembly having at least one turn of a conductor on a coil axis, and a tubular extension at one end of the assembly and having a cylindrical inside surface concentric with the coil axis;

(d) affixing the coil assembly to the diaphragm with the coil axis concentric with the boss portion, the inside surface of the tubular extension engaging the outside surface of the boss portion;

(e) mounting a field magnet within the housing, the magnet having an annular slot for receiving the coil assembly; and (f) mounting the peripheral edge of the diaphragm to the housing, the diaphragm covering the cavity, the coil assembly extending into the annular slot of the field magnet. The method preferably includes the further step of locating a cylindrical strip of a lubricative plastic material within the annular slot for preventing contact between the coil assembly and the magnet.

DRAWINGS

These and other features, aspects, and advantages of the present invention will become better understood with reference to the following description, appended claims, and accompanying drawings, where:

DESCRIPTION

Figure 1:
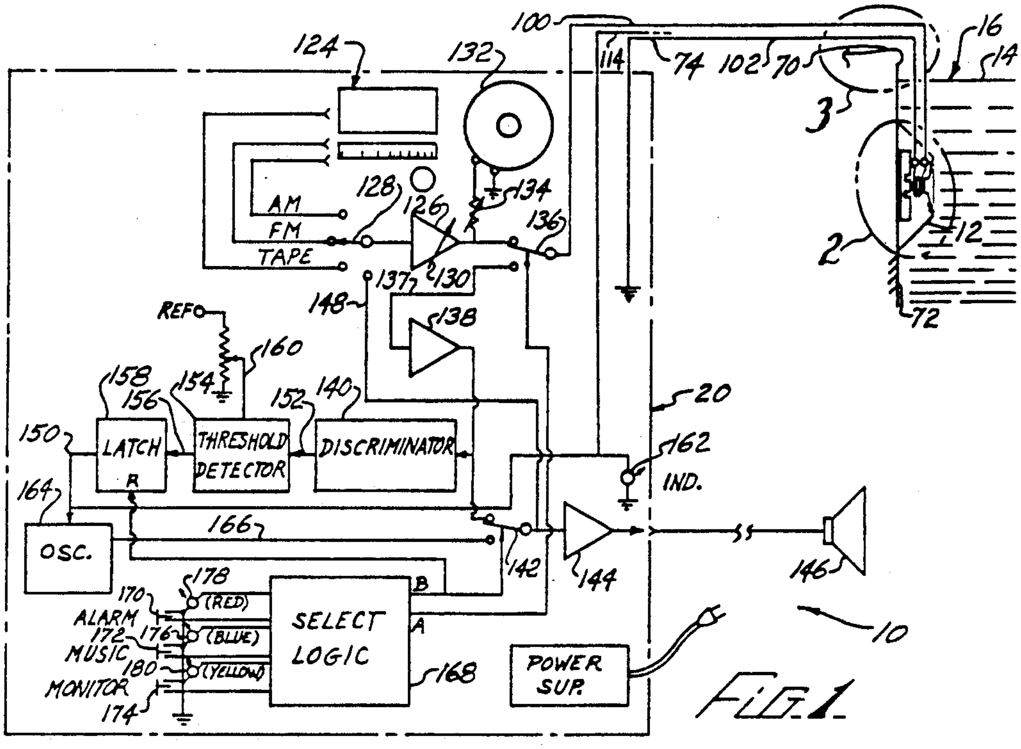
FIG. 1 is a pictorial schematic diagram of an underwater transducer system according to the present invention.
Figure 2:
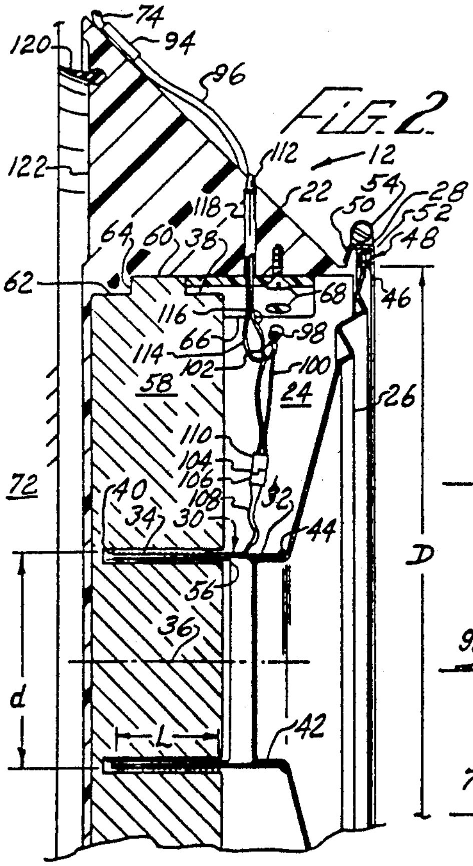
FIG. 2 is a fragmentary sectional elevational view of of the system of FIG. 1 within region 2 of FIG. 1.

The present invention is directed to an aquatic transducer system for producing high-fidelity sound underwater, for monitoring aquatic activity, and for detecting and signalling unauthorised or emergency conditions. With reference to the drawings, most particularly FIGS. 1 and 2, a transducer system 10 according to the present invention includes a transducer unit 12 that is located below a liquid surface 14 of a body of water such as a swimming pool 16, and a control unit 20 that is operatively connected to the transducer unit 12. The transducer unit 12 includes a housing 22 having a cavity 24 therein, the cavity 24 being covered at one side of the housing 22 by a semi-flexible diaphragm 26, and edge mounding means 28 for sealingly connecting the diaphragm 26 at a peripheral edge thereof to the housing 22. As shown in FIG. 2, the housing 22 is formed from a suitable plastic material for excluding water from the cavity 24. A coil assembly 30, including a tubular member 32 having a conductive coil 34 affixed thereto on a coil axis 36, is connected to the diaphragm 26 with the coil axis 36 concentric with the edge mounting means 28, the coil assembly 30 being movable along the coil axis 36 with corresponding flexure of the diaphragm 26. A permanent magnet field assembly 38 having an annular slot or cylindrical gap 40 is fixedly mounted within the cavity 24 with the gap 40 also concentric with the mounting means 28, such that the coil axis 36 is also at least approximately concentric with the gap 40, the coil 34 being axially movable therein.

In order to facilitate production of the transducer unit 12 with the coil axis 36 concentric with the gap 40, the diaphragm 36 is formed with a centrally located cylindrical boss portion 42 therein, the tubular member 32 being located relative to the diaphragm 36 by a close fit with the boss portion 42. A forward extremity of the tubular member 32 is formed perpendicular to the coil axis 36 for contacting the diaphragm 36 at locations immediately proximate the boss portion 42, further facilitating proper alignment of the tubular member 32. The tubular member 32 is affixed to the boss portion 42 by a suitable epoxy bond 44. The edge mounting means 28 includes a gasket member 46 that is formed from a flexible material having C-shaped cross-section for receiving a peripheral edge 46 of the diaphragm 36, and a clamp assembly 48 for compressing the gasket member against an outwardly extending, conical flange portion 50 of the housing 22. The clamp assembly 48 includes a ring member 52 that is formed with a tapered C-shaped cross-section, and a clamp screw 54 for drawing together opposite ends of the ring member 52.

A cylindrical strip 56 of a lubricative plastic material such as Teflon ® is located within the gap 40 for maintaining the coil assembly concentric with the gap 40 by insuring that the coil assembly 30 does not directly contact the field assembly 38. The coil assembly 30 is prevented from making such direct contact by the tubular member 32 coming into sliding contact with the strip 56, the lubricative properties of the plastic material preventing excessive distortion in the axial movement of the coil assembly instead of contacting the field assembly 38, for maintaining a high-fidelity correlation between sound waves in the water and a voltage across the coil 34.

The field assembly 38 includes a body member 58, and a belt member 60 rigidly affixed thereto, the body member 58 having a cylindrical outside body surface 62 concentric with the gap 40, the belt member 60 extending outwardly from the body surface 62 and forming a locating shoulder 64 that is oriented perpendicular to both the body surface 62 and the gap 40. The field assembly 38 is mounted in the housing 22 by locating engagment of the body surface 62 and the shoulder 64 with corresponding portions of the cavity 24 for concentrically positioning the gap 40 relative to the coil axis 40. A plurality of retainer members, one of which is designated 66 in FIG. 2, is affixed to the housing 22 within the cavity 24 by a plurality of screw fasteners 68, for holding the field assembly 38 with the shoulder 64 in contact with the corresponding portion of the cavity 24.

Figure 3:
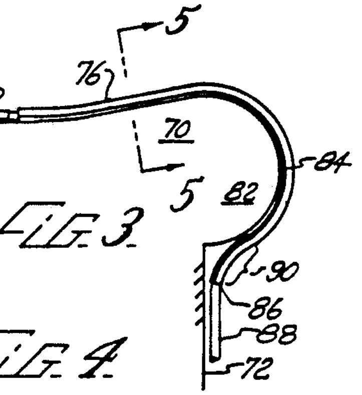
FIG. 3 is a sectional elevational view of the system of FIG. 1 within region 3 of FIG. 1.
Figure 4:
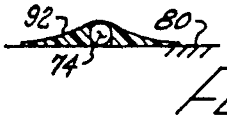
FIG. 4 is a sectional elevational detail view of the system of FIG. 1 on line 4—4 of FIG. 3.
Figure 5:
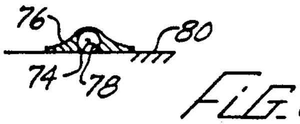
FIG. 5 is a sectional elevational detail view of the system of FIG. 1 on line 5—5 of FIG. 3.

With further reference to FIGS. 3-5, the transducer unit 12 is suspended from a coping portion 70 of the swimming pool 16, the coping portion 70 being formed at an upper extremity of a side wall 72 of the pool 16. A transducer cord 74 that connects the transducer unit 12 to the control unit 20 extends over the coping portion 70, the cord 74 engaging a hanger member 76 that hooks onto the coping portion 70 for supporting the transducer unit 12 by the cord 74. The hanger member 76 is preferably made from a relatively soft metallic material for field-forming to conform to a lateral profile of the coping portion 70, so that the hanger member 76 can formed to closely follow such profile without the use of special tooling. Accordingly, the hanger member 76 is relatively elongated, having uniform cross-section, incorporating a snap-in groove 78 for gripping the cord 74. Typically, the coping portion 70 forms an extension of a deck surface 80, having a raised lip 82 that extends horizontally a short distance over the liquid surface 14 to a lip extremity as shown in FIG. 3. As further shown in FIG. 3, the hanger member 76 is formed for resting on the lip 82, extending from the deck surface 80 in close conformity with the lip 82, downwardly proximate the lip extremity 84 to a lower terminus 86 of the groove 78, the terminus 86 being located horizontally more closely to the side wall 72 than the lip extremity 84 for supporting proximate the side wall 72 a depending portion 88 of the cord 74. Preferably the hanger member 76 is formed with a reverse curvature for avoiding a sharp bend in the cord at the as indicated at 90 in FIG. 3, thereby avoiding damage to the cord 74 that might otherwise result from loading by the transducer unit 72.

A cover member 92 is provided for a portion of the transducer cord 74 that extends on the deck surface 80 between the hanger member 76 and the control unit 20, the cover member 92 protecting the cord 74 from wear and other damage resulting from traffic about the swimming pool 16, as well as for preventing those passing by from being tripped by the cord member. The cover member 92 can be formed from a suitable length of conventional flexible plastic power line floor covering strip.

The depending portion 88 of the transducer cord 74 is connected to the transducer unit 12 for support thereof by means of a stress relief clamp 94 that is fixed on the housing 22, the cord 74 forming a loop 96 between the clamp 94 and a sealed feedthrough 98, the cord 74 passing into the cavity 24 by means of the feedthrough 98. The cord 74 includes a pair of transducer conductors, one such being designated transducer conductor 100 in FIG. 2. A shield conductor 102 of the cord 74 functions as the other transducer conductor. Conductor extensions of the transducer conductor 100 and the shield conductor 102 are operatively connected to the coil 34 through a polarized connector 104 having a first connector member 106 at a free end of a flexible member 108 that extends in a generally radial direction from the tube member 32 of the coil assembly 30, and a mating second connector member 110 that is electrically connected to the conductors 100 and 102 of the transducer cord 74. The first connector member 106, being electrically connected to the coil 34 through the flexible member 108, functions as a pair of coil terminals of the coil 34. The flexible member 108 between the tubular member 32 and the connector 104 serves to isolate the mass of the connector 104 from the coil assembly 30, for enhancing the high-fidelity correlation of the movement of the coil 34 with sound waves in the pool 16.

A transducer alarm indicator 112 is mounted to the housing 22 for external visual exposure. One side of the indicator 112 is electrically connected to the control unit 20 through an indicator conductor 114 that forms a part of the transducer cord 74 for indicating occurrence of an alarm condition described below. The opposite side of the indicator 112 is connected through an indicator ground lead 116 to the shield conductor 102 of the transducer cord 74 for providing a return electrical path. The indicator conductor 114 and the ground lead 116 protrude the retainer 66 and an indicator sleeve 118 that sealingly holds the indicator 112 in position exposed to view from outside of the transducer unit 12, the sleeve 118 in turn being retained in the housing 22 by the retainer 66.

The suspension of the transducer unit 12 by the transducer cord 74 locates the housing 22 proximate the side wall 72 of the pool 16 by virtue of the close proximity of the depending portion 88 of the cord 74 to the side wall 72 from the hangar member 76 as described above. Further, the housing 22 is semi-rigidly affixed to the side wall 72 by a suction ring 120 that sealingly protrudes from a back side 122 of the housing 22.

The control unit 20 includes an audio source 124 and a power amplifier 126 for driving, through the transducer conductor 100 of the transducer cord 74, the transducer unit 12 as an underwater speaker. Typically, the audio source 124 provides AM, FM and tape signals which are selectively input to the power amplifier 126 through a source selector 128 as shown in FIG. 1. The power amplifier 126 includes a main volume control 130 for adjusting the level of sound that is produced underwater by the transducer 12. The control unit 20 also includes a monitor speaker 132 for monitoring the output of the power amplifier 126, the monitor speaker 132 being connected to the amplifier output through a monitor attenuator 134 for adjusting the volume output of the monitor speaker 132 relative to the output of the power amplifier 126. A mode output switch 136, further described below, is connected in series between the output of the power amplifier 126 and the transducer conductor 100 for effecting a speaker mode in which a speaker connection of the coil 34 to the power amplifier 126 is completed as described above; and a microphone mode for making a microphone connection whereby the transducer unit 12 is operative as a microphone for picking up sounds that are produced by activity in the swimming pool 16.

In the speaker mode, the transducer 12 is particularly effective for producing sound underwater that is a high-fidelity reproduction of the output of the power amplifier 126, because the coil assembly 30 is properly centered relative to the gap 40 of the field assembly 38 without requiring a conventional centering spider that would otherwise diminish and distort the axial movements of the diaphragm 26. Also, the lubricative strip 56 within the gap 40 insures that the coil assembly 30 cannot come into direct contact with the field assembly 38, and any contact between the tubular member 32 of the coil assembly with the strip 56 produces only minimal distortion. Further, the diaphragm 26 is generously sized, preferably having an active peripheral diameter D of at least 8 inches and, more importantly, the coil assembly 30 and the field assembly 38 are very large in relation to the size of the diaphragm 26, the coil 34 having a diameter d that is at least 20% of the diaphragm active peripheral diameter D, the coil 34 also having an active length L within the gap 40 that is at least approximately 10% of the diameter D for allowing a multiplicity of turns of the coil 34 to occupy a very thin annular region, permitting a narrow spacing of the gap 40, thus facilitating a very high field strength of the field assembly 38 within the gap 40 and consequent high efficiency of the transducer unit 12.

Another important feature of the present invention is that diaphragm 26 is easily field replaceable. In particular, the diaphragm 26 may be removed from the transducer unit 12 by loosening the clamp screw 54 for removing the clamp assembly 48, thus allowing the diaphragm 26, together with the gasket member 46, to be separated from the flange portion 50 of the housing 22. Next, the coil assembly 30 is withdrawn sufficiently from the gap 40 to provide access to the connector 104 for separation of the first connector member 106 from the second connector member 110, thereby completing the disassembly of the diaphragm 26 from the transducer unit 12. Replacement by a new diaphragm 26 and attached coil assembly 30 is also easily accomplished by reversing the steps for disassembly. Moreover, initial assembly of the transducer unit 12 is facilitated in the same manner by the combination of the removable clamp assembly 48 and the polarized connector 104, which also facilitates proper polarization of multi-transducer systems.

Figure 10:
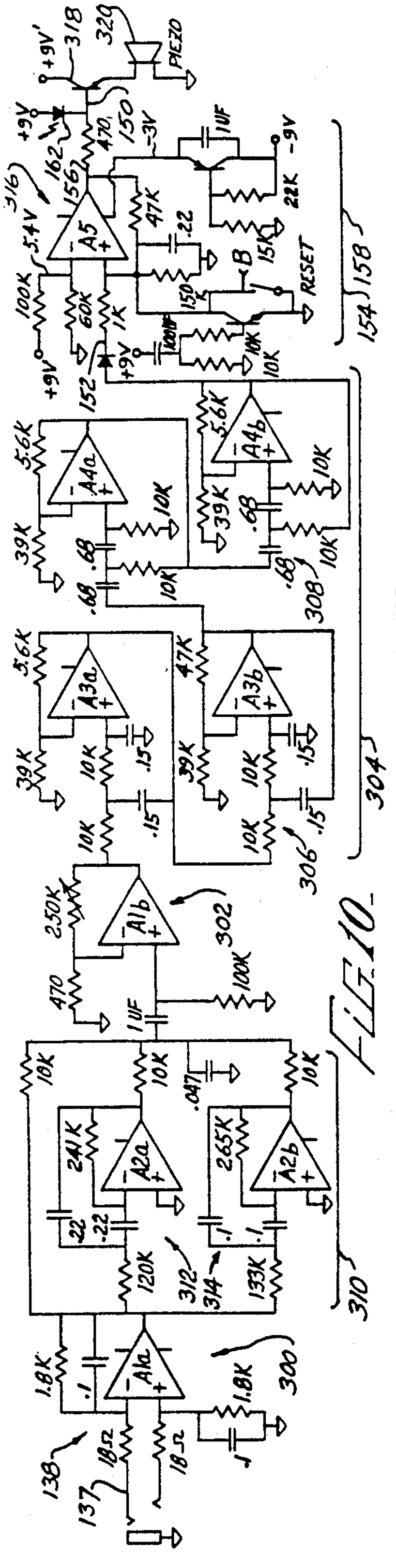
FIG. 10 is a schematic circuit diagram of an electronic discriminator portion of the system of FIG. 1.

As introduced above and with further reference to FIG. 10, the control unit 20 also provides a microphone mode, described herein. The mode output switch 136 is operative in response to a mode signal, designated mode signal A in FIG. 1, for connecting the transducer conductor 100 by a microphone path 137 to the input of a signal amplifier 138, the signal amplifier 138 being operatively connected for driving an alarm discriminator 140 that described below and, through a submode switch 142 that is also described below, an output amplifier 144 for driving a remote speaker 146, the connection of the signal amplifier 138 to the submode switch 142 being also tied to a monitor input, designated 148 in FIG. 1, of the source selector 128 for driving the monitor speaker 132 in response to the sounds in the swimming pool 16 that are picked up by the transducer unit 12.

The submode switch 142 is operative in response to a submode signal, designated submode signal B in FIG. 1, for effecting a monitor submode in which the connection between the output of the signal amplifier 138 and the input of the output amplifier 144 together with the monitor input 148 to the source selector 128 is completed; and an alarm submode for operatively connecting an alarm signal 150 to the monitor input 148 and the output amplifier 144.

In the alarm submode, there is a need for detecting disturbances likely to be associated with a distress situation, while ignoring normal activity. For example, when an object weighing from about 10 to about 100 pounds falls into the pool, there is a reasonable possibility that a baby or child is in distress. On the other hand, the continuous occurrence of a relatively high-frequency (100 Hz or higher) sound is indicative of rain, not distress. For generating the alarm signal 150 according to the present invention, a discriminator output 152 of the alarm discriminator 140 drives a threshold detector 154 for producing a detector output 156, the detector output 156 being connected to a latch circuit 158 having the alarm signal 150 as an output thereof. As shown in FIG. 10, the alarm discriminator 140 is implemented as a bandpass filter circuit including a differential preamplifier stage 300 that has a low-pass corner frequency of approximately 100 Hz, the preamplifier stage 300 incorporating the signal amplifier 138. An adjustable gain buffer amplifier 302 that is responsive to the differential amplifier 300 feeds a bandpass filter 304 having cut-off frequencies of 20 Hz and 100 Hz, including a two-stage low-pass section 306 having a corner frequency of 106 Hz and a series-connected two-stage high-pass section 308 having a corner frequency of 23.5 Hz. Each of the filter sections 306 and 308 is connected for achieving a frequency gain rolloff of 24 dB per octave. The connection of the differential amplifier 300 to the buffer amplifier is made through a notch filter 310, the notch filter 310 having shunt-connected a 60 Hz section 312 and a 120 Hz section 314 for partially removing 60 Hz and 120 Hz noise components.

The threshold detector 154 is responsive to the discriminator output 152, and to an adjustable reference signal 160 for producing the detector output 156 in response to an adjustably predetermined alarm threshold level of the discriminator output 152. As further shown in FIG. 10, the threshold detector 154 is implemented with an operational amplifier 316 having positive feedback for combining the function of the latch 158. Accordingly, the alarm signal 150 is maintained in an inactive state until the detector output 156 becomes active, the latch circuit 158 driving the alarm signal 150 to an active level thereafter. When the alarm submode is terminated in response to operator intervention, as described below, the latch circuit 158 is reset in response to a reset connection to the submode signal B, restoring the alarm signal 150 to its inactive state. The alarm signal 150 is operatively connected to an alarm indicator 162 on the control unit 20 and, through the indicator conductor 114, the transducer alarm indicator 112. As shown in FIG. 1, an alarm oscillator 164 is interposed between the alarm signal 150 and the submode switch 142 for producing an alarm burst signal 166, the alarm burst signal 166 being connected through the submode switch 142, in the alarm submode, to the monitor input 148 and the output amplifier 144 for audibly driving the monitor speaker 132 and the remote speaker 146 from commencement of an alarm condition until the latch circuit 158 is reset by operator intervention as described above. Also, and as shown in FIG. 10, the alarm signal 150 is connected through a driver transistor 318 to an alarm horn 320, the alarm horn 320 incorporating a piezoelectric transducer and a counterpart of the alarm oscillator 164 for producing an audible alarm indication without requiring the connection through the submode switch 142. Also, the alarm indicator 162 (and/or the transducer alarm indicator 112) can be implemented as a flashing light emitting diode by the use of a commercially available flashing LED module.

For controlling the mode signal A and the submode signal B, a mode logic circuit 168 is responsive to operator actuation of an alarm switch 170, a music switch 172, and a monitor switch 174. The mode logic circuit 168, shown as a functional block in FIG. 1, can be constructed from conventional logic circuitry for performing operations described herein, using methods which are known to those skilled in using such logic circuitry. With the source selector 128 set to one of the AM, FM, or tape inputs from the audio source 124, operation of the music switch 172 effects the speaker mode for producing the speaker connection by the mode switch 136 in response to the mode signal A, and simultaneous activation of a speaker mode indicator 176 that is associated with the music switch 172. Subsequent operation of either the alarm switch 170 or the monitor switch 174 extinguishes the speaker mode indicator 176, effecting the microphone mode for switching the mode switch 136 to the microphone connection in response to the mode signal A. Also, in case of operation of the alarm switch 170, an alarm mode indicator 178 that is associated therewith is activated by the logic circuit 168, which also effects the alarm submode by switching the submode switch 142 to the alarm connection and enabling the latch circuit 158 in response to the submode signal B.

In case of termination of the speaker mode by operation of the monitor switch 174, a monitor mode indicator 180 that is associated therewith is activated by the logic circuit 168, which also effects the monitor submode of the microphone mode by maintaining the monitor connection of the submode switch 142 and a reset condition of the latch circuit 158 in response to the submode signal B. Electrical power for the logic circuit 168, the power amplifier 126, the signal amplifier 138, the output amplifier 144, and the other components of the control unit 20 is provided by appropriate connections (not shown) to a conventional power supply 182 which is powered from AC mains and/or batteries.

Figure 6:
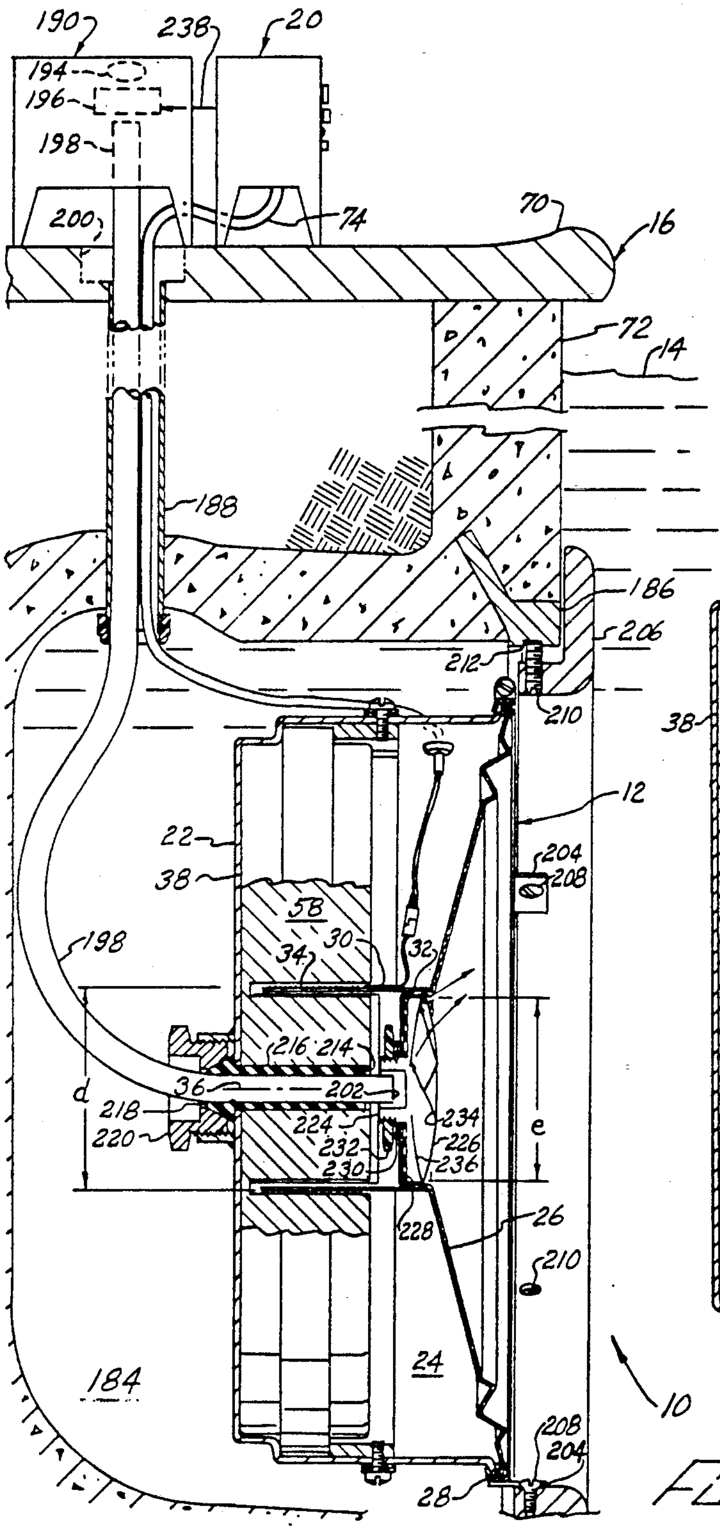
FIG. 6 is a fragmentary sectional elevational view of as in FIG. 2 showing an alternative configuration of the system of FIG. 1.

With further reference to FIG. 6, an alternative configuration of the transducer system 10 has the transducer unit 12 mounted in a fixture cavity 184 that is formed in the side wall 72 of the pool 16, the fixture cavity 184 typically being configured for receiving a conventional underwater lamp assembly (not shown). The fixture cavity 184 has a mounting ring 186 associated therewith, and a power conduit 188 for feeding electrical power to the cavity 184. In this configuration, an important feature of the present invention is the inclusion of illumination means 190 in the transducer unit 12 for transmitting light from an illumination source 192 through the diaphragm 26 and into the water of the swimming pool 16. As shown in FIG. 6, the illumination source 192 includes a lamp 194, a light modulator 196, and a fiber-optic conduit 198, which are conventional components of a commercially available product. The conduit 198 passes downwardly below the deck surface 80, through a junction cavity 200 to which the power conduit 188 is connected, and through the power conduit 188 into the fixture cavity 184. According to the present invention, the conduit 198 protrudes the housing 22, continuing along the coil axis 36 to a point of termination 202 that is proximate the diaphragm 26.

In FIG. 6, the housing 22 is shown as being formed from a sheet of a metallic material such as corrosion resistant steel. As shown in FIG. 6, the retainer 66 for the field assembly 38 is formed as a single slotted ring that is threadedly engaged by the fasteners 68, the fasteners 68 sealingly protruding the housing 22 from the outside thereof. The housing 22 is supported within the fixture cavity 184 by a plurality of mounting tabs 204 that are rigidly attached to the ring member 52 of the clamp assembly 48 the mounting tabs extending axially outwardly for attachment to the inside of a bezel member 206 by corresponding mounting screws 208. The bezel member 206 is secured to the mounting ring 186 by a plurality of set screws 210 that engage an annular inside enlargement 212 of the mounting ring 186.

The field assembly 38 is provided with a field passage 214 for receiving the conduit 198, the conduit 198 being centered on the coil axis of 36 by a sleeve member 216, the sleeve member 216 being formed of a flexible material such as neoprene and having a tapered head portion 218 that extends external to the housing 22 for sealed clamping engagement by a clamping ring 220 that threadingly engages a cylindrical extension 222 of the housing 22 for fixably locating the axial position of the termination 202 and for excluding water from the cavity 24.

An important feature of the present invention is an optical element 224 that is sealingly mounted to the diaphragm 26 within the boss portion 42 for transmitting light from the conduit 198 through the diaphragm 26, the element 224 having a head portion 226 that substantially fills the boss portion 42 for spreading the illumination to an exit diameter e that is approximately equal to the coil diameter d of the coil assembly 30. The optical element 224 protrudes the diaphragm 226, being sealingly mounted thereto by appropriate washers, such as the washers 228 and 230, and a clamp nut 232.

In a preferred form of the optical element 224, the head portion 226 incorporates a pair of mirrored surfaces, designated first mirrored surface 234 and second mirrored surface 236 in FIG. 6. The combination of the head portion 226 with the mirrored surfaces 234 and 236 uniformly spreads the incoming light from the conduit 198 within the head portion 126 for efficiently transmitting the light from the optical element 124 into the water of the pool 16, thereby uniformly illuminating the pool 16 in response to the illumination source 192. Moreover, the output of the output amplifier 144 of the control unit 20 can drive a modulator input 238 of the illumination source 192 for controlling the light modulator 196, thereby varying the illumination of the pool 16 in response to the audio source 124.

Figure 7:
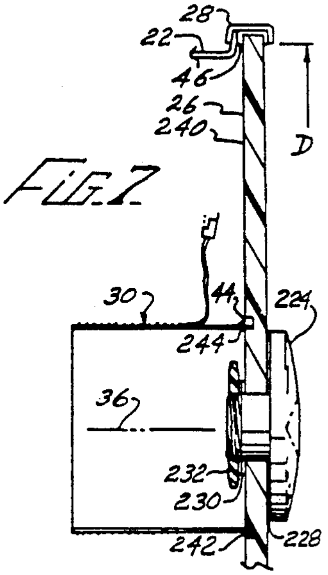
FIG. 7 is a fragmentary sectional elevational view showing an alternative configuration of a portion of the system shown in FIG. 6.

With further reference to FIG. 7, it has been discovered that the diaphragm 26 can be advantageously configured as a disk diaphragm 240, the diaphragm 240 having an annular groove 242 for axially receiving an end portion of the tubular member 32, the tubular member 32 being centered by engagement with a boss portion 244 of the diaphragm 240 that is formed by the groove 242. The diaphragm 240, being configured as a flat disk, can be inexpensively molded or machined from a readily available plastic material such as Plexiglas ®, such that the transducer unit 12 has enhanced durability and is easier to clean. So configured, the diaphragm preferably has a thickness of about 0.125 inch, the outside diameter D being approximately 7.5 inches. As further shown in FIG. 7, the optical element 224 protrudes the diaphragm 224 and is sealingly fastened thereto by the washers 228 and 230, and the clamp nut 232, in the manner shown in FIG. 6.

Figure 8:
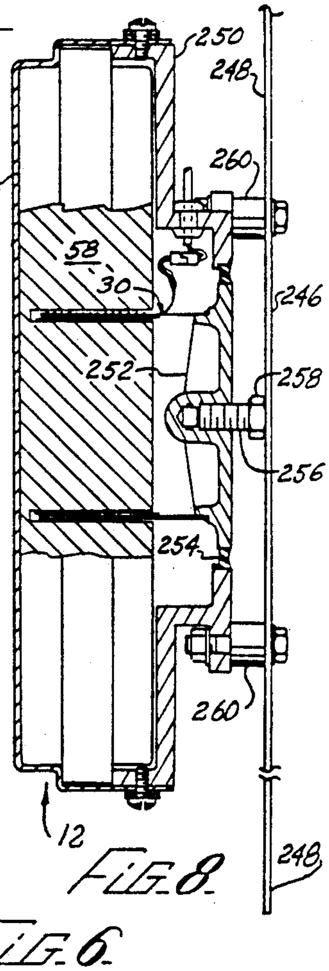
FIG. 8 is fragmentary sectional elevational view as in FIG. 6, showing another alternative configuration of the system of FIG. 1.

With further reference to FIG. 8, it has also been discovered that a particularly effective configuration of the transducer unit 12 incorporates a diaphragm 246 that is confugured with overhanging, cantilevered edge portions 248, the coil assembly 30 and the field assembly 38 being enclosed in a housing 250 that is spaced away from the diaphragm 246. An armature 252 that is axially movable within the housing 250, being sealingly connected thereto by a flexible sealant 254, has the coil assembly rigidly attached thereto as described above, the armature 252 being connected to the diaphragm 246 by a cap screw 256 that threadingly engages the armature 252, a head portion 258 of the capscrew 256 bearing against a central point of the armature 246. The diaphragm 246 is connected to the housing 250 by a plurality of stand-off fasteners 260 that are located in a circular pattern about the cap screw 256.

Figure 9:
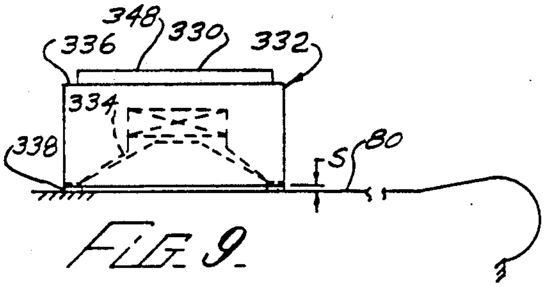
FIG. 9 is a fragmentary elevational view of an auxiliary transducer for the system of FIG. 1.
Figure 11:
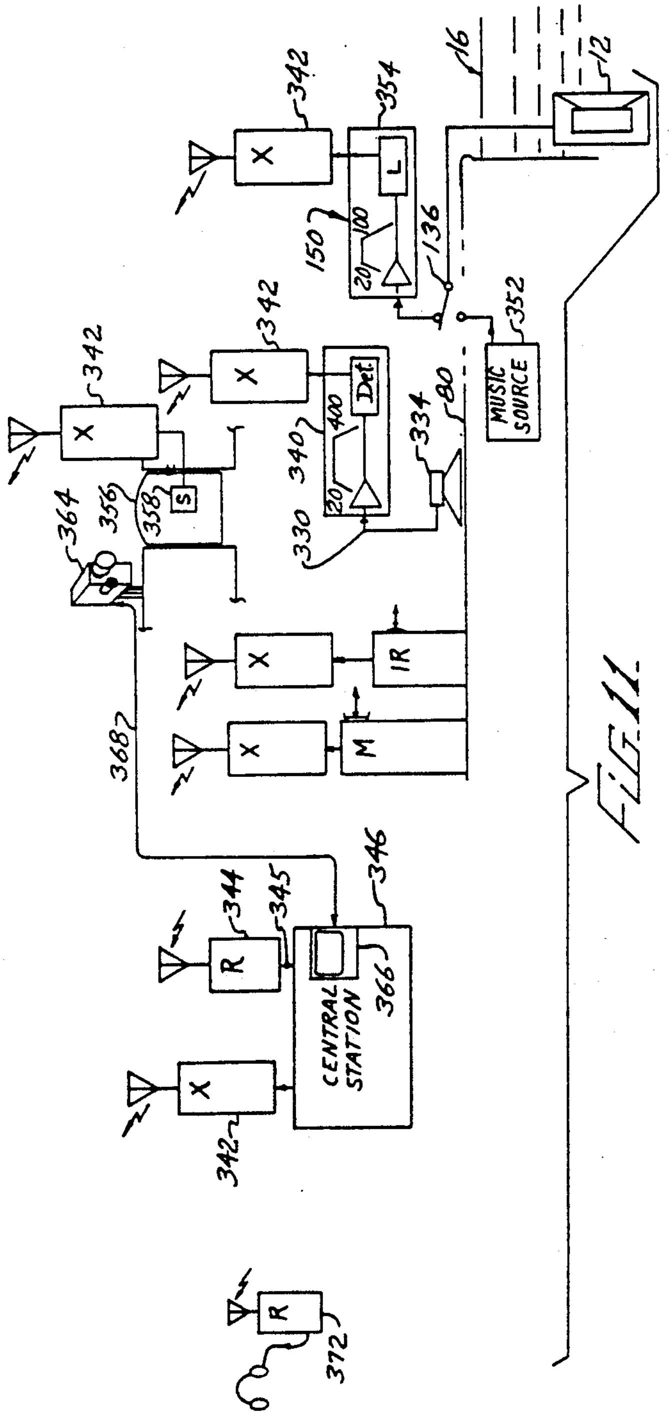
FIG. 11 is a functional block diagram showing another alternative configuration of the system of FIG. 1.

With further reference to FIGS. 9 and 11, the transducer system 10 can incorporate one or more auxiliary transducers 330, such as a deck transducer 332 for detecting the close approach of intruders to the pool 16 prior to any entry of the pool 16 by such intruders This is an important feature of the present invention that greatly enhances the safety of the pool 16 in that an alarm condition can be sensed and responded to without waiting for an actual emergency such as the falling of a baby into the pool 16. As shown in FIG. 9, the deck transducer 332 includes a conventional permanent magnent speaker-microphone 334 that is mounted in a deck transducer housing 336, the housing 336 positioning the microphone 334 in a downward orientation and approximately flush with an underside of the housing 336. The housing 336 is equipped with a plurality of housing feet 338 for spacing the underside of the housing 336 above the deck surface 80 by a spacing S of approximately 0.125 inch. Accordingly, the deck transducer 332 is particularly responsive to low-frequency vibrations of the deck surface 80, and is also responsive to atmospheric sounds that are carried in the space below the housing 336. As shown in FIG. 11, the deck transducer 332 is connected through a deck alarm circuit 340 that incorporates counterparts of the discriminator 140 and the threshold detector 154 to a radio transmitter 342, the transmitter 342 sending an alarm transmission to a radio receiver 344 of a central station 346 of the transducer system 10. The deck alarm circuit 340 incorporates circuitry corresponding to the band-pass filter 304, but with the frequency response of the low-pass section 306 extended upwardly for responding to mid-range frequencies. Preferably the deck alarm circuit 340 has a band-pass frequency response of from about 20 Hz to about 400 Hz. The deck transducer 332 is provided with a top-mounted solar cell array 348 for charging a battery (not shown) that is included with the deck alarm circuit 340 for powering both the circuit 340 and the transmitter 342. The radio transmitter 342 and receiver 344 provide for convenient location of the deck transducer 332 on the deck surface 80 nearby the pool 16, without the need for running wires that would otherwise connect the deck transducer 332 into the transducer system 10.

Similarly, and as also shown in FIG. 11, the transducer unit 12 is connected to an underwater module 150 that is provided with another of the radio transmitters 342 for obviating a need for wiring between the transducer unit 12 and the central station 146 The underwater module 150, which has another of the solar cell arrays 148, can be located on the deck surface 80 proximate the pool 16. As shown in FIG. 11, the underwater module 150 includes the mode switch 136 for selectively coupling a music source 152 to the transducer unit 12 in a manner similar to the above description of the control unit 20. The underwater module 150 also incorporates the alarm discriminator 140 and the threshold detector 154 in an underwater alarm circuit 154.

For enhanced reliability of the transducer system 10, especially under varient environmental conditions, additional counterparts of the auxiliary transducer are provided as further shown in FIG. 11 and described herein. The pool 16 is depicted as being accessible through a gate 356, the gate 356 being provided with an acceleration sensor 358 that incorporates a mercury switch or the like, the sensor 358 being operatively connected for activating another of the radio transmitters 342. Also, the system 10 is provided with an optical scanner unit 360 and a microwave scanner unit 362, the scanner units 360 and 362 each being operatively connected for activating corresponding counterparts of the radio transmitter 342.

The radio receiver 344 of the central station 346 is responsive to each of the transmitters 342 for setting a system alarm signal 345 when any one of the auxiliary transducers 330 or the transducer unit 12 activates the associated radio transmitter 342 in response to a corresponding activation of its alarm signal 150. In this configuration of the system 10, the deck alarm circuit 340, the underwater alarm circuit 354, the acceleration sensor 358, and each of the scanner units 360 and 362 activates the associated radio transmitter 342 for a short period of time for conserving battery power to the transmitters 342. In an exemplary configuration of the system 10, the transmitters 342 are activated for about three seconds upon occurrence of an alarm condition.

The transmitters 342 are operative at a carrier frequency on the order of 10 MHz, the actual carrier frequency being determined by approporately selecting an oscillator crystal in a manner known to those skilled in the art. Prototype circuits of the transmitters 342 have been fabricated for testing in an experimental version of the transducer system 10, the carrier frequency being 10.126 MHz, the circuits being similar to those that are commonly used by hobbiests. When activated, each of the transmitter circuits draws approximately 47 milliamps of current at 9 V, with essentially no current drain when inactive.

As further shown in FIG. 11, the transducer system 10 includes a closed circuit television camera 364 that is mounted for surveillance in the vicinity of the pool 16. The camera 364 is operatively connected to a TV monitor 366 that is located within the central station 346. Electrical power is carried to the camera 364 by a camera cable 368 that also transmits conventional video signals to the monitor 366. According to the present invention, occurrence of the system alarm signal 345 at the central station 346 results in activation of the camera 364, thereby producing an image at the monitor 366. The activation of the camera 364 can be for a predetermined period of time, such as for a period of 10 minutes. As also shown in FIG. 11, the TV camera 364 is equipped with a camera microphone 370 that is connected through the camera cable 368 to a monitor speaker (not shown) of the TV monitor 366 for audio surveillance of the vicinity of the pool 16. Further, the camera microphone 370 is operative as a speaker in a two-way communication between an operator at the monitor 366 and an intruder within range of the camera microphone 370, the monitor 366 being also equipped with a monitor speaker (not shown) that is operable as a microphone. A closed circuit TV system that is suitable for use as the camera 364 and the monitor 366 in the present invention is available commercially.

As further shown in FIG. 11, the system 10 also includes a portable remote station 372 for passive alert in response to the alarm transmission of any of the radio transmitters 342. Although not necessarily required, the central station 346 is provided with one of the radio transmitters 342 (which can be more powerful than the others) for relaying the alarm transmission to the remote station 372. Typically the transmitter 342 of the central station 346 is operative at the same carrier frequency as that of the other transmitters, but this is not necessary. A user within audio or visual range of the remote station, in response to an audio or visual indication of the alarm condition as reproduced by the remote station 372, would either move to the central station for viewing the monitor 366, or take other remedial action such as moving directly to the vicinity of the pool 16.

Although the present invention has been described in considerable detail with reference to certain preferred versions thereof, other versions are possible. For example, the latch circuit 158 can be implemented such that it is "cocked" upon occurrence of a first activation of the detector output 156, the alarm signal 150 being activated only if the detector output 156 is also active after a fixed interval such as two seconds after the first activation, thereby excluding false activations of the detector output 156 from activating the alarm signal 150. Also, the latch circuit 158 can be implemented for automatic reset after a predetermined alarm interval, such as for momentary activation of the transmitter 342. Further, the camera microphone 370 can be provided with a counterpart of the deck alarm circuit for activating the system alarm 345 in response to sounds that are picked up by the camera microphone 370. Also, monitor 366 can be operatively connected to a video recorder for recording on tape the video from the camera 364 during and immediately following occurrences of the system alarm 345. Moreover, the transducer unit 12 can incorporate a deflector for shielding the unit 12 from harmful contact by a pool sweep mechanism, the transducer unit 12, together with its transducer cord 74 being isolated by spring suspension within the deflector for preventing false alarm signals that would otherwise be produced by objects contacting the deflector. The deflector can form a slot or other opening for permitting fluid communication between the diaphragm 26 and outside of the deflector, the opening being covered by a screen. Therefore, the spirit and scope of the appended claims should not necessarily be limited to the description of the preferred versions contained herein.

What is claimed is:

1. An underwater transducer system for a body of water, comprising:

(a) a housing;

(b) transducer means in the housing and having a pair of transducer terminals, whereby a voltage between the transducer terminals is correlated with sound waves in the water;

(c) signal amplifier means;

(d) signal output means, located outside of the body of water;

(e) microphone connection means for operatively connecting the signal amplifier means between the signal output means and the transducer terminals, whereby the signal output means is responsive to the sound waves in the water for signalling activity in the water to a location outside the water; and (f) threshold means for producing an alarm signal in response to a predetermined output from the signal amplifier means, the threshold means comprising a band-pass discriminator frequency filter circuit having a first corner frequency of approximately 20 Hz and a second corner frequency of approximately 100 Hz for filtering an output of the signal amplifier means, whereby a predetermined relatively low energy level signal pattern associated with a crisis condition produces the alarm signal, and a higher energy level signal pattern associated with normal pool activity primarily outside of a pass band between the corner frequencies does not produce the alarm signal.

2. The system of claim 1, wherein the threshold means comprises adjustment means for setting a desired alarm magnitude of the signal amplifier means output.

3. The system of claim 1, wherein the filter circuit produces a frequency gain rolloff of at least approximately 24 dB per octave outside of the first and second corner frequencies.

4. The system of claim 1, further comprising a housing indicator on the housing, the housing indicator being operatively connected to the alarm signal for indicating occurrence of the alarm condition.

5. The system of claim 1, further comprising latch means for maintaining the alarm signal following the occurrence of the predetermined output from the signal amplifier means.

6. The system of claim 1, further comprising a transmission means an a receiver means wherein the transmission means comprises a radio transmitter operatively responsive to the threshold means, and the receiver means comprises a radio receiver for producing the system alarm signal in response to the alarm transmission.

7. An underwater transducer system for a body of water, comprising:

(a) a housing;

(b) transducer means in the housing and having a pair of transducer terminals, whereby a voltage between the transducer terminals is correlated with sound waves in the water;

(c) signal amplifier means;

(d) signal output means, located outside of the body of water;

(e) microphone connection means for operatively connecting the signal amplifier means between the signal output means and the transducer terminals, whereby the signal output means is responsive to the sound waves in the water for signalling activity in the water to a location outside the water;

(f) threshold means for producing an alarm signal in response to a predetermined output from the signal amplifier means, the threshold means comprising a discriminator frequency filter circuit for filtering an output of the signal amplifier means; and (g) an auxiliary transducer for sensing activity outside of the body of water, and means for producing the alarm signal in response to the auxiliary transducer.

8. The system of claim 7, further comprising a plurality of the auxiliary transducers, each of the auxiliary transducers being operatively connected to a radio transmitter, and central station having a radio receiver for generating a system alarm upon occurrence of an alarm condition as detected by any of the auxiliary transducers.

9. The system of claim 7, wherein the auxiliary sensor comprises microphone means comprising a permanent magnet speaker, a housing for the microphone means, and base means for the housing, whereby the housing and the microphone means are supportable in spaced relation above a horizontal deck surface for coupling both vibrational movement of the deck surface and atmospheric sounds to the microphone means.

10. The system of claim 1, further comprising oscillator means for transmitting an alarm tone in response to the alarm signal.

11. An underwater transducer system for a body of water, comprising:

(a) a housing;

(b) transducer means in the housing and having a pair of transducer terminals, whereby a voltage between the transducer terminals is correlated with sound waves in the water;

(c) signal amplifier means;

(d) signal output means, located outside of the body of water;

(e) microphone connection means for operatively connecting the signal amplifier means between the signal output means and the transducer terminals, whereby the signal output means is responsive to the sound waves in the water for signalling activity in the water to a location outside the water;

(f) an audio signal source;

(g) speaker connection means for operatively connecting the signal source to the transducer terminals, whereby the sound waves in the water are produced in response to the audio signal source; and (h) switching means for selectively inhibiting the microphone connection means in a first mode wherein the sound waves in the water are produced in response to the audio signal source, and for selectively inhibiting the speaker connection means in a second mode wherein the signal output means is responsive to the sound waves in the water for signalling activity in the water to a location outside the water.

12. The system of claim 11, including power amplifier means operatively connected between the audio signal source and the transducer terminals in the first mode.

13. The system of claim 11, further comprising threshold means for producing an alarm signal during the second mode of the switching means in response to a predetermined output from the signal amplifier means.

14. The system of claim 13, wherein the second mode of the switching means is operative in a monitor submode wherein the signal output means is operatively connected to the signal amplifier means for continuously monitoring sound produced by activity in the body of water, and an alarm submode wherein the signal output means is operatively connected to the threshold means for transmitting an occurrence of the alarm signal.

15. A method for monitoring activities proximate a body of water, comprising the steps of:

(a) submerging transducer means within the body of water, the transducer means being operative for producing an electrical signal in response to sound waves in the body of water;

(b) frequency filtering the electrical signal for producing a filter circuit output, comprising the further steps of:

(i) attenuating frequency components of the electrical signal at frequencies below a first corner frequency. of approximately 20 Hz relative to such components above the first corner frequency; and (ii) attenuating frequency components of the electrical signal at frequencies above a second corner frequency of approximately 100 Hz relative to such components below the second corner frequency, the filter circuit output being dominantly responsive to a first energy level pattern of the electrical signal associated with a crisis condition, and proximately unresponsive to a second, higher energy level pattern of the electrical signal at frequencies outside of a frequency pass band between the first and second corner frequencies associated with normal pool activity; and (c) signalling an alarm in response to a predetermined magnitude of the filter circuit output.

16. The method of claim 15, wherein the step of frequency filtering the electrical signal for producing a filter circuit output is performed at respective gain roll-off slopes of 24 dB per octave.

* * * * *